United States Patent [19]

Ponyik, Jr. et al.

[11] 4,332,701
[45] Jun. 1, 1982

[54] SPRAYABLE HIGH SOLIDS POLYESTER RESIN COMPOSITIONS

[75] Inventors: Charles A. Ponyik, Jr., Maple Heights, Ohio; Michael A. Tobias, Bridgewater, N.J.

[73] Assignee: Dunlop Limited, London, England

[21] Appl. No.: 160,536

[22] Filed: Jun. 18, 1980

[51] Int. Cl.$^3$ .......................... C09D 3/52; C09D 3/64; C09D 3/66
[52] U.S. Cl. .................................. 524/539; 525/443; 528/305; 528/308; 428/480; 428/482; 524/604
[58] Field of Search .................. 260/21, 22 CQ, 22 R; 525/443; 528/305, 308; 428/480, 482

[56] References Cited

U.S. PATENT DOCUMENTS

| | | | |
|---|---|---|---|
| 1,141,944 | 6/1915 | Dawson | 260/22 R |
| 1,888,849 | 11/1932 | Dawson | 260/22 R |
| 2,979,474 | 4/1961 | Heinrich et al. | 528/305 |
| 4,197,353 | 4/1980 | Tobias et al. | 528/305 |
| 4,229,555 | 10/1980 | Tobias et al. | 528/305 |
| 4,238,583 | 12/1980 | Tobias et al. | 528/308 |

FOREIGN PATENT DOCUMENTS

| | | | |
|---|---|---|---|
| 2155801 | 5/1973 | Fed. Rep. of Germany | 528/308 |
| 2359012 | 6/1974 | Fed. Rep. of Germany | 528/308 |
| 38-24747 | 11/1963 | Japan | 528/305 |
| 49-97094 | 9/1974 | Japan | 528/305 |
| 50-97691 | 8/1975 | Japan | 528/305 |

Primary Examiner—Ronald W. Griffin
Attorney, Agent, or Firm—Stevens, Davis, Miller & Mosher

[57] ABSTRACT

There are disclosed thermosettable polyester resins which are the reaction products of specified amounts of a benzenedicarboxylic acid component (e.g.: 1,3-benzenedicarboxylic acid), a trihydroxy alkyl component (e.g.: 2-ethyl-2-(hydroxymethyl)-1,3-propanediol), a short chain alkylene diol component having four or fewer carbon atoms in the primary carbon chain between the hydroxyl moieties (e.g.: 2,2-dimethyl-1,3-propanediol), a dihydroxy alkyl constituent having four to ten carbon atoms in the primary carbon chain between the hydroxyl moieties (e.g.: 1,6-hexanediol), and a monocarboxylic acid component (e.g.: benzoic acid). Such polyesters, having a number average molecular weight of from about 400 to about 1600 and a combined acid and hydroxyl number of about 50 to about 250 milligrams of KOH per gram of polyester, are found to be especially useful in high solids content coating formulations.

5 Claims, No Drawings

SPRAYABLE HIGH SOLIDS POLYESTER RESIN COMPOSITIONS

BACKGROUND OF THE INVENTION

Field of the Invention

This invention is concerned with thermosettable, highly aromatic polyester resins and sprayable, high solids coating compositions based on such resins.

SUMMARY OF THE INVENTION

This invention provides polyester condensation products of a reaction mixture comprising:

(a) between about 40% and about 60% by weight benzenedicarboxylic acid;

(b) between about 2% and about 18% by weight of a trihydroxy alkyl component;

(c) between about 9% and about 24% by weight of a short chain alkylene diol component having four or fewer carbon atoms in the primary carbon chain between the hydroxyl moieties;

(d) between about 9% and about 30% by weight of a dihydroxy alkyl compound having four to ten carbon atoms in the primary carbon chain between the hydroxyl moieties; and (e) between about 3% and about 15% by weight of benzoic acid, an alkyl benzoic acid, or a $C_8$–$C_{18}$ aliphatic monocarboxylic acid.

The monomers are combined in ratios substantially within the stated ranges, such that the resulting polyester has a number average molecular weight of from about 400 to about 5000 and a combined acid and hydroxyl value of about 40 to about 250 milligrams of KOH per gram of polyester.

The highly aromatic polyester resins disclosed herein are readily solvated in conventional coating composition solvent vehicles to form stable coating solutions. When combined with an appropriate aminoplast and acid catalyst, such coating solutions may be applied to a suitable substrate and cured to produce coatings exhibiting an outstanding combination of hardness, adhesion, stain resistance, water resistance, extendability and dry heat resistance.

Resins having a number average molecular weight of from about 400 to about 1600 and a combined acid and hydroxyl value of about 50 to about 250 milligrams of KOH per gram of polyester are found to be particularly useful in the formulation of high solids level coating compositions. Such high solids coatings have the same general utility as lower solids level compositions—e.g.: appliance coatings and other general metal applications—but have the additional benefit of lower solvent content and significantly reduced volatile emissions. Useful high solids compositions based on the foregoing lower MW resins may contain between about 10 wt.% and about 60 wt.% on resin solids of an aminoplast, between about 0 and 1.0 wt.% on resin solids of an acid catalyst and an inert organic solvent in an amount sufficient to provide a solids content of between about 55 wt.% and about 100 wt.% based on the total weight of the coating composition. Preferred high solids level coating compositions will contain from about 75 to about 100 wt.% solids in the final formulation before the addition of a pigmenting agent.

DESCRIPTION OF SPECIFIC EMBODIMENTS

Polyester Resins

The benzenedicarboxylic acid component of the polyester resins of the present invention is preferably one of the nonsymmetrical isomers of that compound, and most preferred is 1,3-benzenedicarboxylic acid [isophthalic acid]. 1,2-Benzenedicarboxylic acid [phthalic acid], or its anhydride, may also be used to advantage as the aromatic acid component, either by itself or in combination with 1,3-benzenedicarboxylic acid. The benzenedicarboxylic acid component is used in an amount between about 40% and about 60% by weight of the reaction mixture, based on the total weight of the reactants.

The trihydroxy alkyl component may be a linear or branched hydrocarbon compound and the three hydroxyl functions are attached to either terminal or to nonterminal carbon atoms in the molecule. It has been found that triol compounds having an internal tertiary carbon atom in the hydrocarbon skeleton, such that each of the hydroxyl groups is on a different terminal carbon atom, result in the most desirable configurations for the polyester product. For this reason the preferred trihydroxy compounds are those exemplified by 2-ethyl-2-(hydroxymethyl)-1,3-propanediol [trimethylolpropane; TMP] and 2-(hydroxymethyl)-2-methyl-1,3-propanediol [trimethylolethane; TME; pentaglycerol]. The trihydroxy alkyl component is used in an amount between about 2% and about 18% by weight of the reaction mixture, based on the total weight of the reactants.

The preferred short chain alkylene diol component, which constitutes between about 9% and about 24% by weight of the reaction mixture, comprises one or more of those short chain alkylene diol compounds having four or fewer carbon atoms in the hydrocarbon chain between the two hydroxy groups. It is preferred that this diol component be 2,2-dimethyl-1,3-propanediol [neopentyl glycol], either by itself or in admixture with other short chain alkylene diol compounds. Other diol compounds, such as 1,2-ethanediol, 1,2-propanediol and 1,3-butanediol, are similarly useful in the preparation of the resins disclosed herein and are preferably used in admixture with 2,2-dimethyl-1,3-propanediol.

The second dihydroxy component of the polyester resins of this invention comprises a dihydroxy alkyl compound having four to ten carbon atoms in the primary carbon chain between the two hydroxyl groups. The preferred compound is 1,6-hexanediol [hexamethylene glycol], but other similar compounds wherein the hydroxyl groups are separated by a chain of four to ten carbon atoms may be successfully substituted therefor. Examples of other useful compounds include, but are not limited to, 1,4-butanediol; 1,5-pentanediol; 1,7-heptanediol; 1,8-octanediol; 1,9-nonanediol; and 1,10-decanediol. This component is used in an amount between about 9% and about 30% by weight of the reaction mixture, based on the total weight of the reactants.

It is the discovery of this invention that the inclusion of a monocarboxylic acid in the reaction mixture provides polyester resins which are formulated into high solids coating compositions having excellent sprayability, as compared with similar coating compositions containing polyester resins that are not modified with a monocarboxylic acid. Utilizable monocarboxylic acids are benzoic acid, $C_1$–$C_5$ alkylbenzoic acids, and aliphatic monocarboxylic acids. Non-limiting examples of aromatic monocarboxylic acids are benzoic acid, 3-methylbenzoic acid, 4-methylbenzoic acid, 4-ethylbenzoic acid, 4-propylbenzoic acid, 4-isopropylbenzoic acid, 4-t-butylbenzoic acid, 3-t-butylbenzoic acid, 2-t-butylbenzoic acid, and 4-pentylbenzoic acid.

The aliphatic monocarboxylic acids utilizable herein have between 8 and 18 carbon atoms and a molecular weight between about 140 and about 290. Mixtures of monocarboxylic acids are contemplated. Non-limiting examples of the aliphatic monocarboxylic acids and mixtures thereof are octanoic acid, nonanoic acid, decanoic acid, undecanoic acid, lauric acid, tridecanoic acid, myristic acid, pentadecanoic acid, palmitic acid, heptadecanoic acid, stearic acid, oleic acid, linoleic acid, linolenic acid, ricinoleic acid, linseed fatty acids, safflower fatty acids, soya fatty acids, tall oil fatty acids, cottonseed fatty acids, castor oil fatty acids, dehydrated castor oil fatty acids, and tung oil fatty acids.

The monocarboxylic acid component is used in an amount between about 3% and about 15% by weight of the reaction mixture, based on the total weight of the reactants.

The esterification reaction is normally carried out at temperatures between about 175° C. and about 250° C., for a period of time ranging between about 3 hours and about 10 hours. A conventional catalyst for the promotion of esterification reactions, such as dibutyltin oxide, dibutyltin dilaurate, or triphenyl phosphite, can be used in catalytic amounts (e.g.: 0.01 to 1.0% by weight) to aid in the reaction. During the reaction it is advantageous to remove the water evolved from the esterification, for instance by means of a suitable trap which condenses and draws off the water vapors, by azeotropic distillation with toluene or xylene, or by flushing the reactor with an inert gas to sweep the vapors away from the reactants. The reactants are combined in appropriate relative amounts, substantially within the specified ranges, such that the polyester product of the above reaction process is a substantially noncrystalline resin material having a number average molecular weight of from about 400 to about 5,000 and combined acid and hydroxyl values of about 40 to about 250 milligrams of KOH per gram of polyester.

Polyester resins within the approximate number average MW range of 400 to 1,600 and having combined acid and hydroxyl values of about 50 to about 250 milligrams of KOH per gram of polyester are especially beneficial in the formulation of desirable high solids level coating compositions—i.e. those having a total solids content within the approximate range of 55 to 100 wt.% and preferably about 75-100 wt.%. The relatively higher MW resins, that is, those having a number average MW of about 1,400 to 5,000 and combined acid and hydroxyl values of about 40 to 160 milligrams of KOH per gram of polyester, have significant utility in the formulation of the more conventional solids level coatings, i.e. coating compositions having from about 35 to 55 wt.% of solids in the formulation.

Coating Compositions

The essential components of the coating compositions of this invention are the foregoing polyester resin, an aminoplast, optionally an acid catalyst, and an inert organic solvent.

The material used to thermoset the coating is a conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins, and other aminoplast-aldehyde resins such as those triazine resins produced by the reaction of an aldehyde with formoguanamine, ammeline, 2-chloro-4,6-diamino-1,3,5-triazine, 6-methyl-2,4-diamino-1,3,5-triazine, 2,4,5-trihydrazine-1,3,5-triazine, and 2,4,6-triethyl-triamino-1,3,5-triazine. Generally, such resins are alkylated with an alcohol, such as methanol or butanol. As aldehydes used to react with the amino compounds to form the resinous material, one may use such compounds as formaldehyde, acetaldehyde, crotonaldehyde, acrolein, or compounds which engender aldehydes, such as hexamethylene-tetramine, paraldehyde, paraformaldehyde, and the like. The amount of aminoplast used is preferably between about 5 wt.% and about 25 wt.% on resin solids in the case of conventional solids level compositions and between about 10 wt.% and about 60 wt.% on resin solids in high solids level compositions.

Although it is not essential, it is preferable to use an acid cross-linking catalyst. The acid catalyst may be the acid itself or a derivative that will generate the acid in situ, such as commercially available Aerosol OT which generates sulfonic acid and ammonium nitrate which can be decomposed to form nitric acid. Acids that generally are used to cure aminoplast systems include p-toluenesulfonic acid (pTSA), benzenesulfonic acid, methylsulfonic acid, cyclohexyl sulfonic acid, phosphoric acid, mono- or dialkyl acid phosphates, and many others indicated in the art as suitable curing catalysts. The amount of acid catalyst used is usually between about 0 wt.% and about 1.0 wt.%, based upon total resin solids.

The solvents utilizable in the coating compositions of this invention are the usual volatile solvents used in paints and enamels. Aromatic hydrocarbons are useful, such as toluene, xylene, and aromatic petroleum cuts, e.g., Hi-Sol 4-1 (boils 190.6° C.–260.0° C.) and Solvesso 100 (boils 155.6° C.–172.2° C.). Useful ketones include methyl ethyl ketone (MEK), methyl isobutyl ketone (MIBK), methyl propyl ketone, isophorone, ethyl amyl ketone, and methyl n-amyl ketone. Alcohols are utilizable, such as butanol, amyl alcohol, 2-ethylhexanol, and cyclohexanol. Also of use are the ether alcohols and their acetate esters, such as methoxyethanol, ethoxyethanol, butoxyethanol, hexoxyethanol, methoxypropanol, methoxyethyl acetate, and ethoxyethyl acetate. It is within the contemplation of this invention to use mixtures of two or more solvents. The proportion of solvents included is not critical, since they primarily serve as the volatile vehicle to convey the solid material to the substrate to be coated. The total amount of solvents used will be sufficient to provide a solids content (% NVM) in the so-called conventional embodiment of the compositions of this invention of between about 35 wt.% and about 55 wt.% in the coating composition prior to pigmentation. In the high solids level embodiment, the total amount of solvents used should be sufficient to provide a final solids content of about 55 to 100 wt.%, and preferably between about 75 and 100 wt.% prior to pigmentation.

It is preferred to incorporate a pigment into the coating compositions of this invention. The preferred white pigment is titanium dioxide, but any conventional pigment can be used, such as zinc oxide, bentonite, silica, and chrome yellows, greens, oranges, etc. Sufficient pigment is included to provide an opaque or colored film of the desired intensity and appearance.

The coating compositions of this invention may be applied to any of the usual substrates, i.e.: metal, paper, leather, cloth, etc., using any of the usual methods of application including spraying, direct rollcoating, reverse rollcoating, electrodeposition, flow coating, and the like. The coating composition is primarily useful for coating aluminum, steel, tin plated steel, electrogalvanized steel, and hot dipped galvanized steel. Such metal substrates are usually cleaned and chemically treated to improve the wetting and adhesion of subsequent organic coatings. The coating compositions of this invention are equally useful for primers or as topcoats deposited over base layers of either the same or different types of resinous compositions. After coating the substrate, the coating is cured, preferably by baking for about 5 seconds to about 30 minutes at between about 120° C. and about 315° C.

The following examples demonstrate the preparation of the polyester resins of this invention and coating compositions containing them, along with performance characteristics of such coatings.

EXAMPLE 1

A 5 liter reaction vessel was charged with 744.8 g. of neopentyl glycol (NPG), 762.0 g. of 1,6-hexanediol (1,6-Hex.), 200.0 g. of trimethylolpropane (TMP), 1,912.4 g. of isophthalic acid (IPA), and 380.0 g. of p-t-butylbenzoic acid (Mono). The contents of the reactor were heated gradually to 225° C. during the course of removing the water of reaction through an efficient steam jacketed reflux condenser. The reaction was held until an acid number of 6.3 was attained. Cooling and addition of 772.0 g. of methyl propyl ketone afforded a polyester solution non-volatile content (% NV) of 80.3%, a Gardner-Holdt viscosity (Visc.) of Z1+, an acid number (A.N.) of 4.7, and a weight per gallon of 9.07. The resin had a number average molecular weight (Mn) of 1338 and a weight average molecular weight (Mw) of 2940.

EXAMPLES 2 THROUGH 10

A series of polyester resins was prepared by the technique described in Example 1. The compositions and properties of these resins are set forth in the Table. Abbreviations used for the column headings are shown in Example 1.

weight, 5.0% trimethylolpropane, 21.6% neopentyl glycol, 20.0% 1,6-hexanediol, and 53.4% isophthalic acid. A 79.7% non-volatile content solution in methyl propyl ketone had a Gardner-Holdt viscosity of Z2+, an acid number of 5.2, and a weight per gallon of 9.13.

Cleveland Condensing Humidity Test—This test was carried out in the manner prescribed by Ford Test Method BI 4-2 Procedure of the Ford Motor Company, one of a series of test methods well known to the art. The test panels were exposed to a high humidity atmosphere at 43° C. for 240 hours and amount of blistering was noted.

Bimetallic (Coach Joint) 5% Salt Spray Test—This test was carried out using Ford Test Method BI 3-1 for 750 hours. In this test, a panel of polished CRLC steel and a panel of galvanized steel were flanged and spot-welded together to form a coach joint. This assembly was then sprayed with the coating composition under test and baked 15 minutes at 275° F. At the conclusion of the test, there will be no more than ⅛ inch rust and blister creepage on the CRLC steel adjacent to the joint.

Gravellometer Test—This test was carried out according to Ford Test Method BI 7-1. A coated panel was hung vertically in the Gravellometer and then bombarded with 30 pounds of shot under a pressure of 10 psi. The paint surface is assessed as to the amount of chipping in comparison with a standard reference coating.

Coating Formulation Procedure

The following standard recipe and procedure was used to formulate the polyester resin into a coating formulation for testing.

| Wt. % | Component |
|---|---|
| 17.5 | Polyester resin to be evaluated |
| (A) | |
| 2.1 | Red iron oxide |
| 0.2 | Lamp black |
| 31.4 | Barium sulfate |
| 6.3 | Micronized silica (1.55 microns avg.) |
| 4.3 | Rutile TiO$_2$ |
| 5.4 | Strontium chromate yellow |
| (B) | |
| 9.7 | Methyl n-amyl ketone |
| (C) | |

TABLE

| Example | Composition, Wt. % | | | | | Properties | | | | |
|---|---|---|---|---|---|---|---|---|---|---|
| | NPG | 1,6-Hex. | TMP | IPA | Mono | % NV | Visc. | A.N. | Mn | Mw |
| 2 | 21.0 | 19.5 | 5.0 | 49.5 | 5.0[1] | 79.0 | Z-Z1 | 4.7 | 1246 | 2731 |
| 3 | 20.8 | 19.4 | 5.0 | 49.3 | 5.4[2] | 79.6 | Y | 5.0 | 1594 | 2956 |
| 4 | 23.6 | 16.5 | 5.0 | 49.5 | 5.4[2] | 80.1 | Y− | 5.3 | 1415 | 3101 |
| 5 | 18.4 | 18.9 | 5.0 | 47.4 | 10.2[2] | 78.9 | X− | 6.1 | 1590 | 3786 |
| 6 | 21.4 | 19.9 | 5.0 | 50.5 | 3.2[3] | 78.6 | Z | 4.2 | 1484 | 3026 |
| 7 | 19.4 | 19.8 | 5.0 | 49.6 | 6.2[3] | 78.9 | Z+ | 6.5 | 1307 | 3171 |
| 8 | 21.2 | 19.7 | 5.0 | 50.1 | 4.0[4] | 78.0 | X+ | 5.2 | 1536 | 3242 |
| 9 | 19.0 | 19.6 | 5.0 | 48.8 | 7.6[4] | 78.5 | X-Y | 5.5 | 1627 | 3263 |
| 10 | 18.3 | 17.5 | 5.0 | 44.5 | 14.6[5] | 79.6 | V-W | 3.9 | — | — |

[1] p-t-Butylbenzoic Acid
[2] Lauric Acid
[3] Benzoic Acid
[4] 2-Ethylhexanoic Acid
[5] 97% Linoleic/oleic acids, Sap. No. 193 (Pamolyn 327 B)

EXAMPLE 11 (COMPARATIVE)

Using the technique described in Example 1, a polyester resin was prepared which, for comparison purposes, did not contain a monocarboxylic acid modifier in the reaction mixture. The reaction mixture contained, by

| 12.1 | Polyester resin |
|---|---|
| 7.2 | Hexamethoxymethylmelamine |
| 2.5 | Diethylene glycol monobutyl ether |
| (D) | |

| Wt. % | Component |
|---|---|
| 1.3 | Diethylene glycol monobutyl ether |

(A) Add pigments and extenders to the polyester resin in the order shown under agitation. Agitate with high shearing to a particle size of 6 NS.
(B) Use methyl n-amyl ketone to adjust paste viscosity to 80-90 KU for sand grinding.
(C) Sand grind to 7 NS minimum. Do not exceed 140° F.
(D) Adjust weight solids content to about 78-81% NVM.

EXAMPLE 12 (COMPARATIVE)

A coating formulation was prepared, using the Coating Formulation Procedure, in which the polyester resin was the resin of Example 11. The solids content was 79.14% NVM. This formulation was coded F 20706 for identification in testing.

EXAMPLE 13

A coating formulation was prepared, using the Coating Formulation Procedure, in which the polyester resin was the resin of Example 2. The solids content was 79.10% NVM. This formulation was coded CPHS 35A for identification in testing.

EXAMPLE 14

A coating formulation was prepared, using the Coating Formulation Procedure, in which the polyester resin was the resin of Example 1. The solids content was 79.10% NVM. This formulation was coded CPHS 35B for identification in testing.

EXAMPLE 15

A coating formulation was prepared, using the Coating Formulation Procedure, in which the polyester resin was the resin of Example 6. The solids content was 79.14% NVM. This formulation was coded CPHS 50A for identification in testing.

EXAMPLE 16

A coating formulation was prepared, using the Coating Formulation Procedure, in which the polyester resin was the resin of Example 7. The solids content was 79.14% NVM. This formulation was coded CPHS 50B for identification in testing.

The coating compositions of Examples 12 through 16 were each applied to 6"×12"×20 gauge zinc phosphate treated cold rolled steel panels by hand spraying and baked 15 minutes at 275° F. Dry film thickness was 1 mil. All the coatings passed the 240 hours Cleveland Condensing Humidity test and the Bimetallic (Coach Joint) 5% Salt Spray test. They also exhibited excellent hold-out and chipping resistance in the Gravellometer test.

Two very important considerations in spray application of a high solids coating formulation, however, are atomization (sprayability) and leveling. In this regard, as compared to the baked coating made from the composition of Example 12 (resin not modified with monocarboxylic acid), the baked coatings made from the compositions of Examples 13 through 16 (modified with monocarboxylic acid in accordance with this invention) were definitely superior, even to the naked eye.

The coating from Example 12 showed a definite "orange peel" appearance, attributable to poor flow properties. Those from Examples 13 through 16 were smooth, showing excellent flow properties. During spray application, the compositions of Examples 13 through 16 exhibited a spray pattern that was visibly finer and better atomized than that of the composition of Example 12.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. Polyester resin condensation products of a reaction mixture comprising:
   (a) between about 40% and about 60% by weight isophthalic acid;
   (b) between about 2% and about 18% by weight of 2-ethyl-2-(hydroxymethyl)-1,3-propanediol;
   (c) between about 9% and about 24% by weight of 2,2-dimethyl-1,3-propanediol;
   (d) between about 9% and about 30% by weight of 1,6-hexanediol; and
   (e) between about 3% and about 15% by weight of benzoic acid; wherein said resin has a number average molecular weight of from about 1400 to about 5000 and a combined acid and hydroxyl value of about 40 to about 160 milligrams of KOH per gram of polyester.

2. A coating composition comprising the polyester resin of claim 1, between about 10 weight percent and about 60 weight percent of an aminoplast crosslinking agent on resin solids, between about 0 and 1.0 weight percent of an acid catalyst on resin solids, and inert organic solvent in an amount sufficient to provide a solids content of between about 75 weight percent and about 100 weight percent, based on the weight of the composition.

3. A coating composition as defined in claim 2 additionally comprising a pigmenting agent.

4. A substrate having a coating of a cured composition as defined in claim 2.

5. A substrate having a coating of a cured composition as defined in claim 3.

* * * * *

UNITED STATES PATENT AND TRADEMARK OFFICE
CERTIFICATE OF CORRECTION

PATENT NO. : 4,332,701
DATED : June 1, 1982
INVENTOR(S) : CHARLES A. PONYIK, JR. and MICHAEL A. TOBIAS It is certified that error appears in the above—identified patent and that said Letters Patent is hereby corrected as shown below:

On the title page,
Change the ASSIGNEE from "Dunlop Limited, London, England" to --Mobil Oil Corporation, New York, N.Y.--.

Change the Attorney, Agent, or Firm from "Stevens, Davis, Miller & Mosher" to --Charles A. Huggett, Michael G. Gilman, Hastings S. Trigg--.

Signed and Sealed this

Tenth Day of August 1982

[SEAL]

Attest:

GERALD J. MOSSINGHOFF

Attesting Officer      Commissioner of Patents and Trademarks